United States Patent
Kosai et al.

(10) Patent No.: US 8,760,320 B2
(45) Date of Patent: Jun. 24, 2014

(54) COMMUNICATION APPARATUS AND COMMUNICATION METHOD

(75) Inventors: Jun Kosai, Inazawa (JP); Kenji Mutou, Kiyosu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 13/558,501

(22) Filed: Jul. 26, 2012

(65) Prior Publication Data
US 2013/0027222 A1    Jan. 31, 2013

(30) Foreign Application Priority Data
Jul. 28, 2011 (JP) ................................. 2011-165628

(51) Int. Cl.
*G08G 1/123* (2006.01)
(52) U.S. Cl.
USPC ........................... 340/992; 340/994; 340/988
(58) Field of Classification Search
USPC ........ 340/906, 907, 32.2, 933, 988, 989, 990, 340/992, 994; 345/1.3, 207; 701/1, 19, 20, 701/31.4, 37, 117–119, 414
See application file for complete search history.

(56) References Cited

U.S. PATENT DOCUMENTS

| | | | |
|---|---|---|---|
| 6,681,157 B2 * | 1/2004 | Kageyama ......................... 701/1 |
| 6,700,506 B1 * | 3/2004 | Winkler et al. ............... 340/994 |
| 7,394,403 B2 * | 7/2008 | Winkler et al. ............... 340/994 |
| 7,395,149 B2 * | 7/2008 | Matsumoto et al. .......... 701/414 |
| 7,860,647 B2 * | 12/2010 | Amano .......................... 701/414 |
| 8,036,820 B2 * | 10/2011 | Sera ............... 701/117 |
| 2010/0106364 A1 | 4/2010 | Sagisaka |

FOREIGN PATENT DOCUMENTS

| | | |
|---|---|---|
| JP | 2006-065391 A | 3/2006 |
| JP | 2006-065667 A | 3/2006 |
| JP | 2008-070261 A | 3/2008 |
| JP | A-2008-245268 | 10/2008 |
| JP | A-2010-288141 | 12/2010 |

OTHER PUBLICATIONS

Office Action mailed Jun. 11, 2013 in the corresponding JP application No. 2011-165628 (English translation).

* cited by examiner

*Primary Examiner* — Van T. Trieu
(74) *Attorney, Agent, or Firm* — Posz Law Group, PLC

(57) ABSTRACT

A communication apparatus is installed in a vehicle. A time information obtaining unit obtains a current time. A state information obtaining unit repeatedly obtains state information representing a state of an own vehicle at the current time. An own vehicle information generating unit estimates predicted arrival positions at specific times between the current time and a specified time, and repeatedly generates own vehicle information including the current position and the predicted arrival positions. An information transmitting unit transmits the own vehicle information. An information storage unit stores the own vehicle information into a first storage section as past own vehicle information. The information transmitting unit obtains an information coincidence degree representing the degree of the coincidence between current own vehicle information and the past own vehicle information, and transmits the current own vehicle information if the information coincidence degree is less than a specified threshold.

18 Claims, 10 Drawing Sheets

FIG.4
| TIME | POSITION | SPEED | TRAVELING DIRECTION |
|---|---|---|---|
| t0 (CURRENT) | p0 | v0 | d0 |
| t1 | p1 | v1 | d1 |
| : | : | : | : |
| t5 | p5 | v5 | d5 |
FIG.5
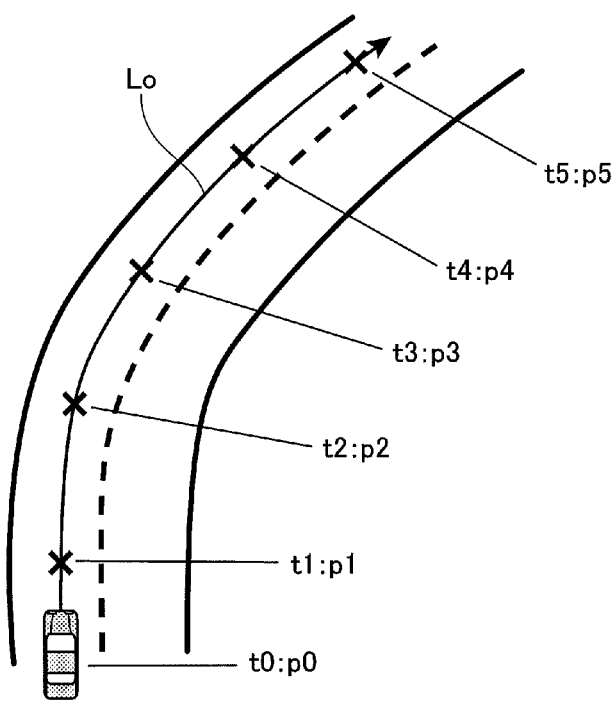
FIG.6
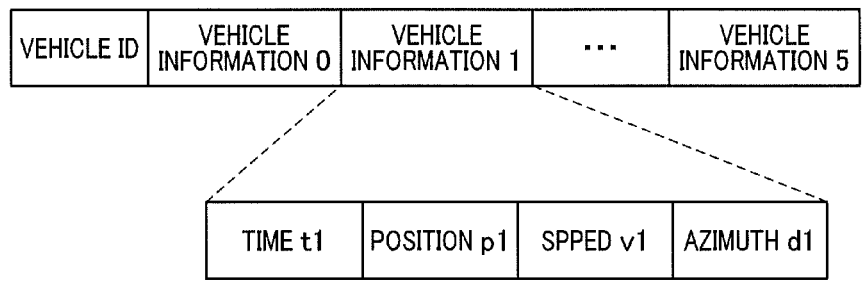

FIG.8

| VEHICLE ID | TIME | | | | | | | | | | FINALLY UPDATED TIME tf |
|---|---|---|---|---|---|---|---|---|---|---|---|
| | t0 | | | t1 | | | ... | t5 | | | |
| | POSITION | VEHICLE SPEED | DIRECTION | POSITION | VEHICLE SPEED | DIRECTION | ... | POSITION | VEHICLE SPEED | DIRECTION | |
| V1 | V1_p0 | V1_v0 | V1_d0 | V1_p1 | V1_v1 | V1_d1 | ... | V1_p5 | V1_v5 | V1_d5 | tf1 |
| V2 | V2_p0 | V2_v0 | V2_d0 | V2_p1 | V2_v1 | V2_d1 | ... | V2_p5 | V2_v5 | V2_d5 | tf2 |
| ... | ... | ... | ... | ... | ... | ... | ... | ... | ... | ... | ... |
| Vn | Vn_p0 | Vn_v0 | Vn_d0 | Vn_p1 | Vn_v1 | Vn_d1 | ... | Vn_p5 | Vn_v5 | Vn_d5 | tfn |

FIG.11

| | | Tp_fix | 1000ms |
|---|---|---|---|
| Tsensor | ACCELERATION (ABSOLUTE VALUE) | <1m/s² | 0ms |
| | | <3m/s² | 100ms |
| | | ≧3m/s² | 200ms |
| | STEERING ANGLE (ABSOLUTE VALUE) | <10° | 0ms |
| | | <30° | 100ms |
| | | ≧30° | 200ms |
| Tmap | INCLINATION (ABSOLUTE VALUE) | <2° | 0ms |
| | | <5° | 100ms |
| | | ≧5° | 200ms |
| | CURVE R | >500m | 0ms |
| | | >100m | 100ms |
| | | ≦100m | 200ms |

COMMUNICATION APPARATUS AND COMMUNICATION METHOD

CROSS-REFERENCE TO RELATED APPLICATION

This application is based on and claims the benefit of priority from earlier Japanese Patent Application No. 2011-165628 filed Jul. 28, 2011, the description of which is incorporated herein by reference.

BACKGROUND

1. Technical Field

The present invention relates to a communication apparatus communicating information, and a communication method.

2. Related Art

Conventionally, an information system is known which is installed in each automobile and is mainly configured with a communication apparatus transmitting and receiving information by inter-vehicle communication to obtain and indicate information on a traffic situation around the own vehicle (e.g. refer to JP-A-2008-245268).

Each communication apparatus configuring this type of information system obtains information on behavior of the own vehicle (hereinafter, referred to as own vehicle information) from various sensors and transmits the information. The communication apparatus receives information on behavior of another vehicle (hereinafter, referred to as other vehicle information) from a communication apparatus installed in the other vehicle. In addition, the communication apparatus indicates the presence of another vehicle having a possibility of colliding with the own vehicle, as a traffic situation around the own vehicle, on the basis of the own vehicle information and the other vehicle information.

According to the information system described above, the information recognized by the communication apparatus (i.e., other vehicle information) is required to be updated along the time axis and to correspond to actual behavior of the other vehicle.

Hence, a communication apparatus configuring an information system is proposed which, if other vehicle information received from a communication apparatus installed in another vehicle represents the other vehicle traveling at a speed higher than that of the own vehicle, promptly returns own vehicle information, and increases the frequency of transmitting the own vehicle information (e.g. refer to JP-A-2010-288141).

As described above, if the frequency of transmitting the own vehicle information is set higher, the own vehicle information corresponding to the actual behavior of the vehicle can be transmitted. However, communications traffic becomes heavy. If the communications traffic becomes too heavy, communication quality can deteriorate due to collisions between signals transmitted from the communication apparatuses.

That is, according to the conventional communication apparatus, it is difficult to make another communication apparatus recognize information corresponding to the actual behavior of the vehicle while suppressing the increase of communications traffic.

SUMMARY

An embodiment provides a communication apparatus and a communication method which make another communication apparatus recognize information corresponding to the actual behavior of a vehicle while suppressing the increase of communications traffic.

As an aspect of the embodiment, a communication apparatus installed in a vehicle is provided, which includes: a time information obtaining unit which obtains a current time; a state information obtaining unit which repeatedly obtains state information which represents a state of an own vehicle at the current time and includes a current position of the own vehicle, a traveling speed of the own vehicle, and a traveling direction of the own vehicle; an own vehicle information generating unit which estimates predicted arrival positions representing positions of the own vehicle at specific times, which are specified by specific time intervals between the current time obtained by the time information obtaining unit and a specified time, which is a specified time length, on the basis of the state information obtained by the state information obtaining unit, and which repeatedly generates own vehicle information including the current position of the own vehicle included in the state information and the predicted arrival positions; an information transmitting unit which transmits the own vehicle information generated by the own vehicle information generating unit; and an information storage unit which stores the own vehicle information transmitted by the information transmitting unit into a first storage section as past own vehicle information. The information transmitting unit obtains, every time the own vehicle information is generated by the own vehicle information generating unit, an information coincidence degree representing the degree of the coincidence between current own vehicle information which is the own vehicle information generated by the own vehicle information generating unit and the past own vehicle information stored in the first storage section, and transmits the current own vehicle information if the information coincidence degree is less than a specified threshold.

BRIEF DESCRIPTION OF THE DRAWINGS

In the accompanying drawings:

FIG. 4 is a diagram illustrating own vehicle information;

FIG. 5 is a diagram showing predicted arrival positions for specific times;

FIG. 6 is a schematic diagram of own vehicle information transmitted from a transmission section;

FIG. 8 is a diagram showing other vehicle information stored in an other vehicle information storage section;

FIG. 11 is a diagram showing information obtained when changing stand-by time.

DETAILED DESCRIPTION OF THE PREFERRED EMBODIMENTS

With reference to the accompanying drawings, hereinafter will be described some embodiments of the present invention.

First Embodiment

<Regarding Information System>

Figure 1:
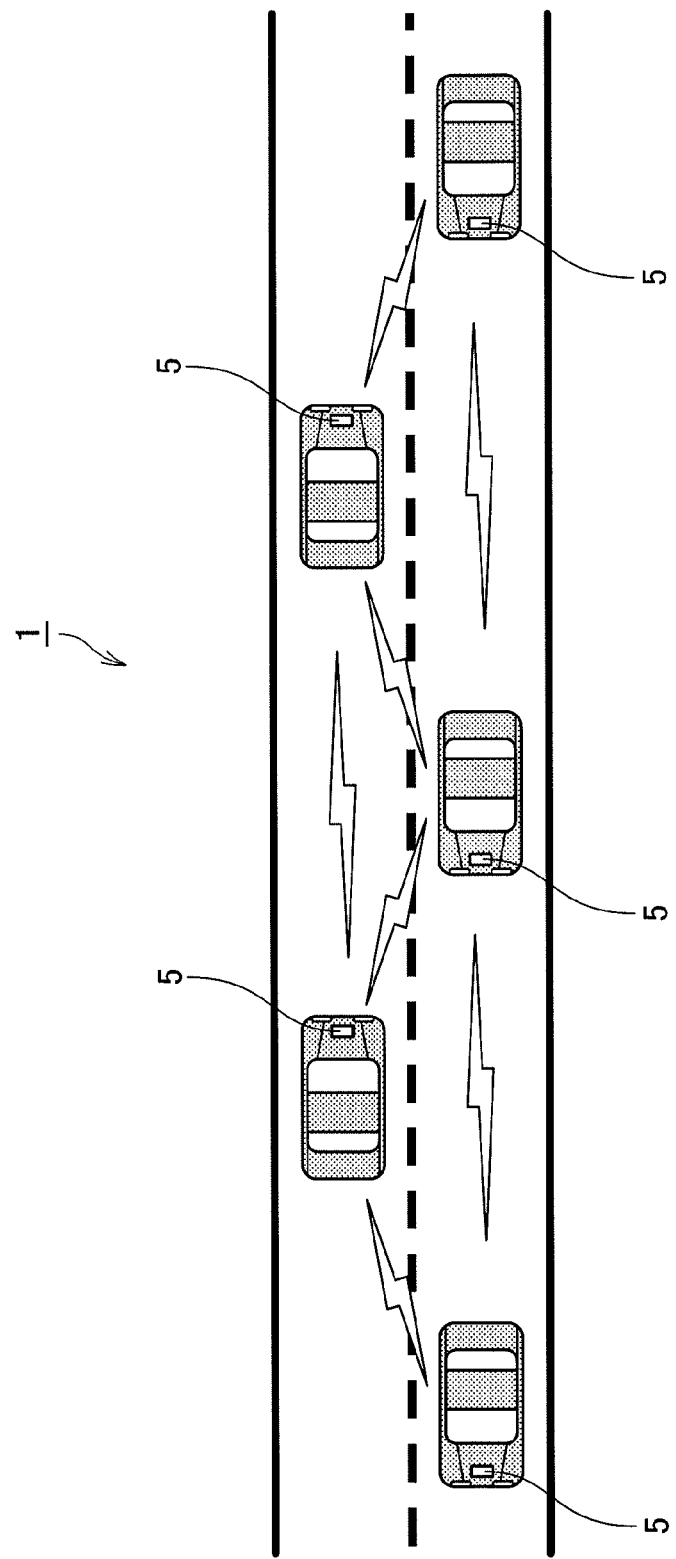
FIG. 1 is a schematic diagram of an information system.

FIG. 1 is a schematic diagram of an information system.

As showing in FIG. 1, an information system 1 is mainly configured by an in-vehicle apparatus 5 installed in each vehicle (automobile). The in-vehicle apparatus 5 is a system collecting information on traffic situations around an own vehicle.

<Regarding in-Vehicle Apparatus>

Next, the in-vehicle apparatus 5 configuring the information system 1 is described.

Figure 2:
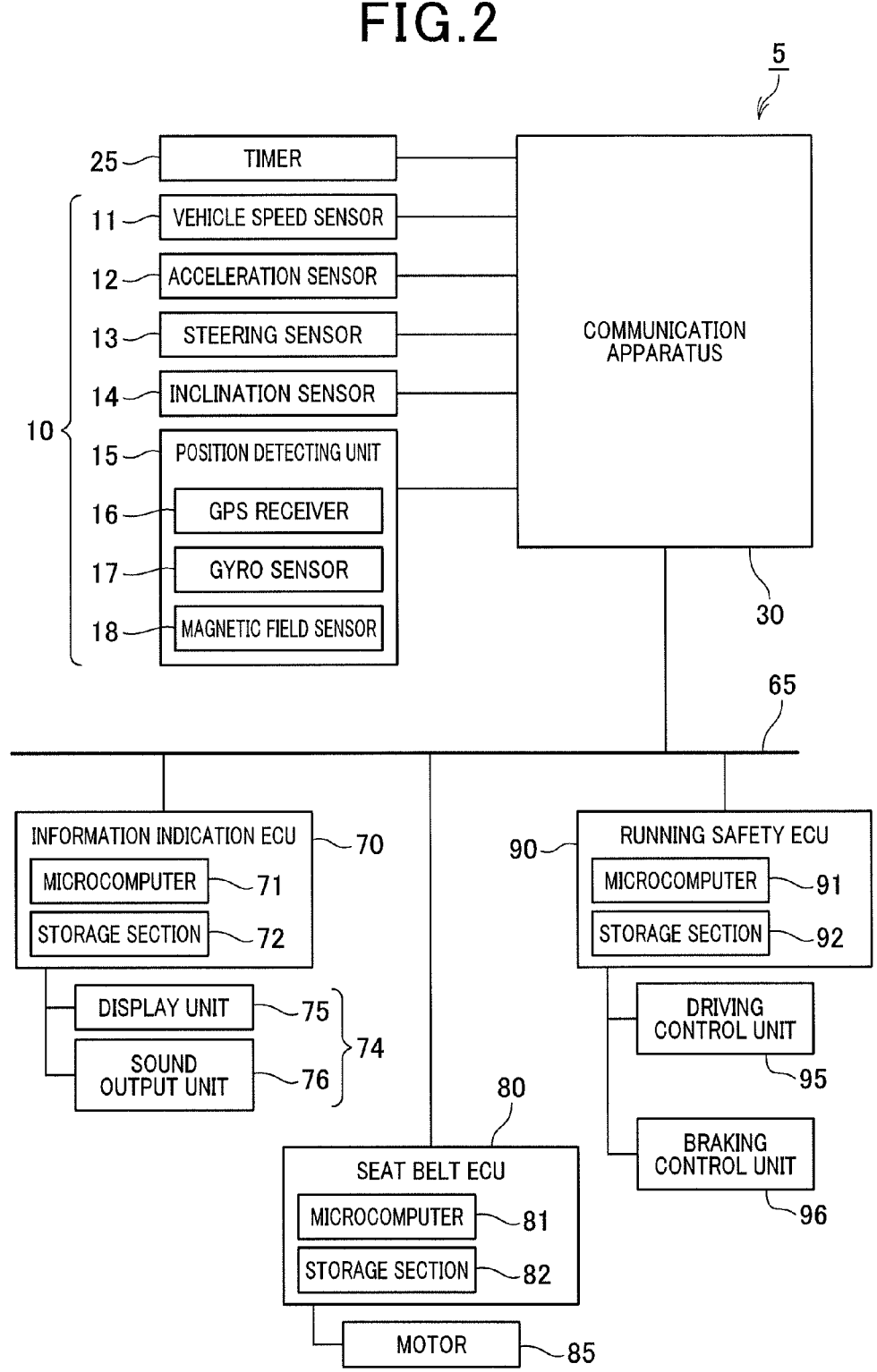
FIG. 2 is a block diagram showing a schematic configuration of an in-vehicle apparatus configuring the information system.

FIG. 2 is a diagram for explaining a schematic configuration of an in-vehicle apparatus.

As shown in FIG. 2, the in-vehicle apparatus 5 is mainly configured with a communication apparatus 30 which communicates information by inter-vehicle communication.

In the present embodiment, the communication apparatus 30 is connected with a timer 25 and a sensor group 10. The timer 25 clocks current time (present time) t0. The sensor group 10 obtains information representing a state of the own vehicle at current time t0 (hereinafter, referred to as "state information"). In addition, the communication apparatus 30 is communicated with an information indication electronic control unit (hereinafter, referred to as "information indication ECU") 70, a seat belt electronic control unit (hereinafter, referred to as "seat belt ECU") 80, and a running safety electronic control unit (hereinafter, referred to as "running safety ECU") 90 via a communication line 65 configuring an in-vehicle network. The information indication ECU 70 controls an indication unit 74 which indicates information. The seat belt ECU 80 controls a seat belt mechanism. The running safety ECU 90 controls a driving mechanism and a braking mechanism.

The sensor group 10 includes a vehicle speed sensor 11, an acceleration sensor 12, a steering sensor 13, an inclination sensor 14, and a position detecting unit 15. The vehicle speed sensor 11 detects vehicle speed of the own vehicle. The acceleration sensor 12 detects acceleration of the own vehicle. The steering sensor 13 detects a steering angle of the own vehicle. The inclination sensor 14 detects the inclination of a position where the own vehicle exists. The position detecting unit 15 detects a current position and an azimuth of the traveling direction of the own vehicle. The position detecting unit 15 includes a known GPS (Global Positioning System) receiver 16, a gyro sensor 17, and a magnetic field sensor 18. The GPS receiver 16 receives a signal from a GPS satellite. The gyro sensor 17 detects an angular rate applied to the own vehicle. The magnetic field sensor 18 detects earth magnetism. Each of the ECUs 70, 80, 90 is configured with a rewritable non-volatile memory device. The ECUs 70, 80, 90 respectively include storage sections 72, 82, 92 and known microcomputers 71, 81, 91. Each of the storage sections 72, 82, 92 stores a processing program and various data. The microcomputers 71, 81, 91 execute the processing program stored in the storage sections 72, 82, 92.

The information indication ECU 70 is connected with a display unit 75 and a sound output unit 76, which are an indication unit 74 (i.e. a controlled object). The display unit 75 displays information as an image. The sound output unit 76 outputs information as a sound. The information indication ECU 70 controls the indication unit 74 so as to output information on traffic situations around the own vehicle (e.g. the presence of another vehicle having a possibility of colliding with the own vehicle), which is running safety control for improving running safety of the own vehicle.

In addition, the seat belt ECU 80 is connected with a motor 85, which is a controlled object and rolls up a seat belt. The running safety ECU 90 is connected with a driving control unit 95 and a braking control unit 96, which are controlled objects. The driving control unit 95 controls the driving mechanism. The braking control unit 96 controls the braking mechanism. Note that the driving mechanism includes a driving force generation unit (e.g. an internal combustion engine or a motor) which generates driving force of the own vehicle, and a transfer system (e.g. a transmission) which transfers the driving force.

The seat belt ECU 80 and the running safety ECU 90 perform running safety control. That is, the seat belt ECU 80 controls the seat belt depending on the traffic situation around the own vehicle. The running safety ECU 90 controls driving force and braking force of the own vehicle depending on the traffic situation around the own vehicle (i.e. adaptive cruise control or pre-crash safety).

<Regarding the Communication Apparatus>

Next, the communication apparatus 30, which is a main part of the in-vehicle apparatus 5, is described.

Figure 3:
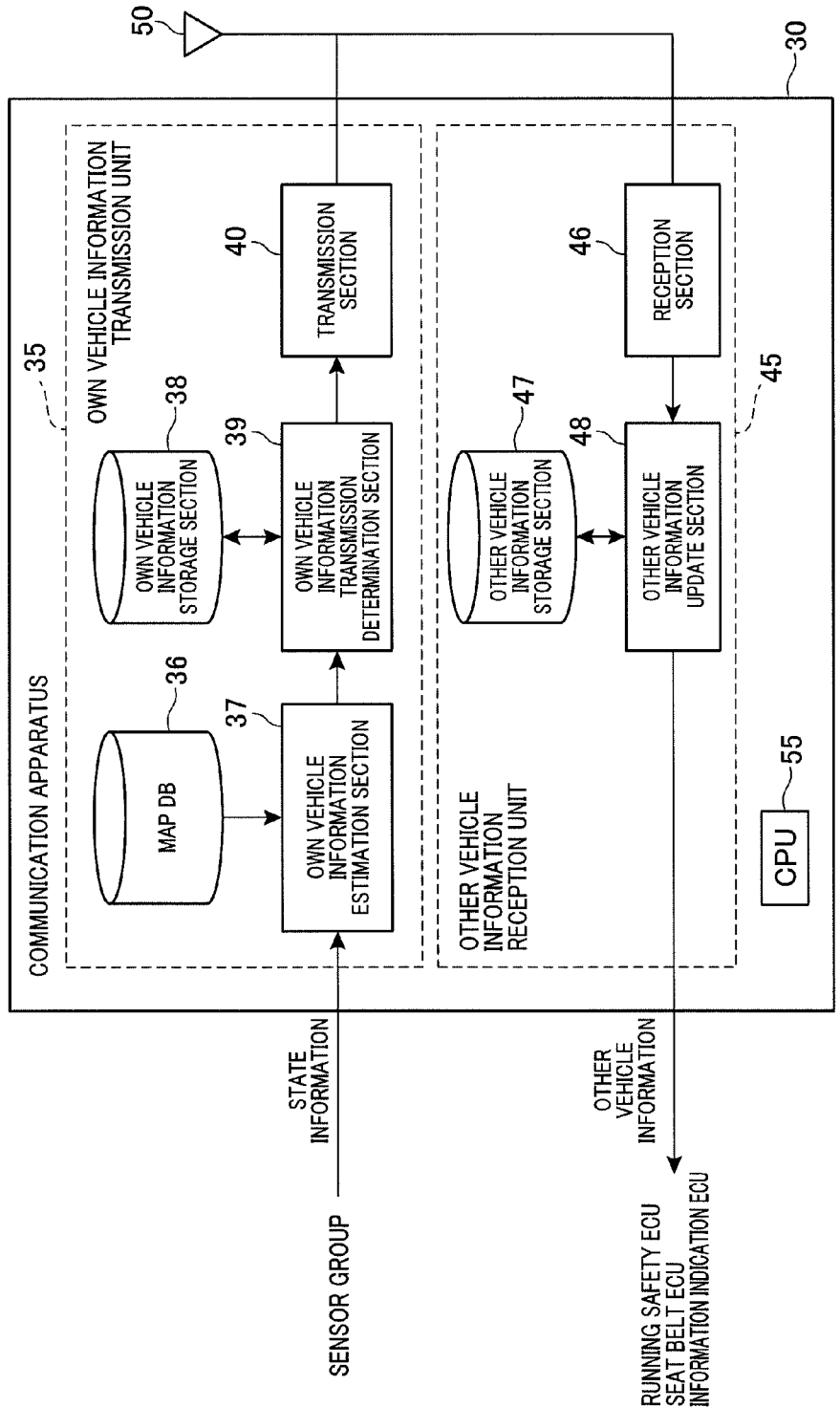
FIG. 3 is a functional block diagram of a communication apparatus.

FIG. 3 is a functional block diagram of the communication apparatus 30.

The communication apparatus 30 estimates states of the own vehicle at current time t0 and at times between the current time t0 and specified time Tp which are specified so as to be equal to or later than the current time t0. The communication apparatus 30 transmits information on the estimated states of the own vehicle (hereinafter, referred to as "own vehicle information"). In addition, the communication apparatus 30 receives information on a state of another vehicle (hereinafter, referred to as "other vehicle information") transmitted from the communication apparatus 30 installed in the other vehicle.

To realize the above functions, as shown in FIG. 3, the communication apparatus 30 includes an own vehicle information transmission unit 35, which transmits the own vehicle information and an other vehicle information reception unit 45, which receives the other vehicle information.

The own vehicle information transmission unit 35 includes a map database (DB) 36 and an own vehicle information estimation section 37. The map DB 36 stores map data. The state of the own vehicle (i.e. own vehicle information) until the specified time Tp is estimated by the own vehicle information estimation section 37 on the basis of the state information obtained from the sensor group 10 and the map data stored in the map DB 36. In addition, the own vehicle information transmission unit 35 includes an own vehicle information storage section 38, an own vehicle information transmission determination section 39, and a transmission section 40. The own vehicle information storage section 38 stores own vehicle information transmitted in past times (previously) (hereinafter, referred to as "past own vehicle information"). The own vehicle information transmission determination section 39 determines whether or not current own vehicle information can be transmitted on the basis of the past own vehicle information stored in the own vehicle information storage section 38 and own vehicle information estimated by the own vehicle information estimation section 37 (hereinafter, referred to as "current own vehicle information"). The transmission section 40 transmits the current own vehicle information determined to be transmittable by the own vehicle information transmission determination section 39 via an antenna 50.

Note that the map data stored in the map DB 36 includes node data, link data, and cost data. The node data concerns nodes representing specified positions on the roads (e.g. an intersection, a fork). The link data concerns links representing roads connecting between the nodes. The cost data concerns unit cost previously assigned to the links. The map data further includes various data, such as road data, topography data, mark data, intersection data, and data of facilities.

<Regarding Own Vehicle Information>

Next, own vehicle information estimated by the own vehicle information estimation section 37 is described.

As shown in FIG. 4, the own vehicle information includes a current position p0 of the own vehicle at the current time t0, the vehicle speed v0 of the own vehicle at the current time t0, and the traveling direction d0 of the own vehicle at the current time t0. In addition, the own vehicle information includes positions p1 to p5 where the own vehicle exist (hereinafter, referred to as "predicted arrival position") at the specific times t1 to t5, vehicle speed v1 to v5 of the own vehicle (hereinafter, referred to as "predicted vehicle speed") at the specified times t1 to t5, and azimuths d1 to d5 of the traveling directions of the own vehicle (hereinafter, referred to as "predicted traveling azimuth") at the specific times t1 to t5.

The specific times t1 to t5 are defined so that specific time intervals (e.g. 100 ms) are determined between the current time t0 to the specified time Tp.

The predicted arrival positions p1 to p5, the predicted vehicle speeds v1 to v5, and the predicted traveling azimuths d1 to d5 are estimated by the own vehicle information estimation section 37. FIG. 5 is a diagram for explaining an estimation method of the predicted arrival positions.

In the present embodiment, it is assumed that the own vehicle continues its behavior exhibited at the current time t0. A track Lo, along which the own vehicle is predicted to move, is checked against the map data. On the map data, the positions where the own vehicle exist at the specific times p1 to p5 are estimated as the predicted arrival positions p1 to p5. Note that the own vehicle information estimation section 37 also estimates, in addition to the predicted arrival positions p1 to p5, the predicted vehicle speeds v1 to v5 and the predicted traveling azimuths d1 to d5 when estimating the predicted arrival positions p1 to p5, assuming that the own vehicle continues its behavior exhibited at the current time to.

In FIG. 6, the transmission section 40 generates groups (vehicle information 0 to 5 in FIG. 6), each of which corresponds to a time, including the current position p0, the vehicle speed v0, the traveling direction d0, the predicted arrival positions p1 to p5, the predicted vehicle speeds v1 to v5, and the predicted traveling azimuths d1 to d5. The transmission section 40 adds identification data (i.e. vehicle ID, hereinafter, referred to as "vehicle identification data") V, for identifying the vehicle in which the in-vehicle apparatus 5 is installed, to the groups, thereby generating the own vehicle information. The transmission section 40 transmits the own vehicle information.

<Regarding a Transmission Process>

Next, an operation of the own vehicle information transmission unit 35 (i.e. transmission process) is described.

Figure 7:
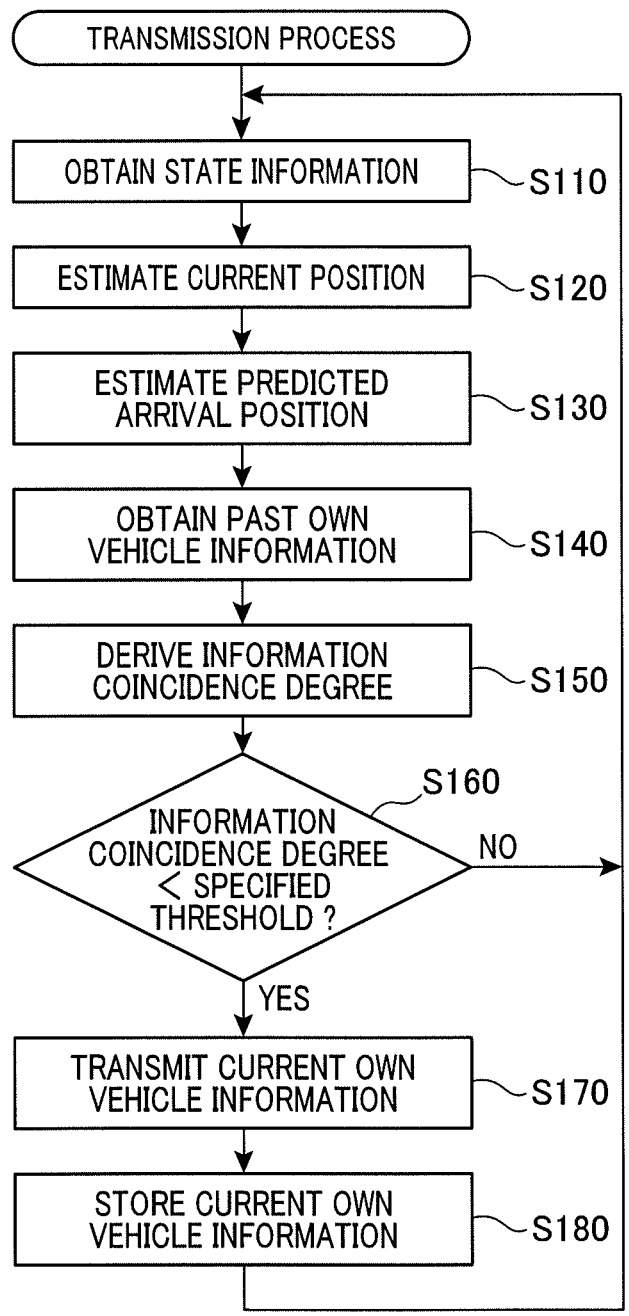
FIG. 7 is a flowchart showing a procedure of a transmission process according to a first embodiment.

FIG. 7 is a flowchart showing a procedure of the transmission process. The transmission process is performed by the control of a CPU 55 (shown in FIG. 3) of the communication apparatus 30.

The transmission process starts when the communication apparatus 30 is activated (in the present embodiment, when the ignition switch is turned on).

When the transmission process starts, state information is obtained from the sensor group 10 (S110). Next, the current position p0, the vehicle speed v0, and the traveling direction d0 are estimated on the basis of the state information obtained in S110 (S120). The estimation of the current position p0, the vehicle speed v0, and the traveling direction d0 in S120 is performed on the basis of at least a detection signal from the position detecting unit 15 and a detection signal from the vehicle speed sensor 11. Since the estimation is a known method, detailed explanation thereof is omitted.

In addition, the predicted arrival positions p1 to p5, the predicted vehicle speeds v1 to v5, and the predicted traveling azimuths d1 to d5 are estimated on the basis of the state information obtained in S110 (S130). Note that the estimation in S120 and S130, that is the generation of the current own vehicle information, is performed at the specific time interval.

Next, the past own vehicle information stored in the own vehicle information storage section 38 is obtained (S140). Then, information coincidence degree representing the degree of the coincidence between the current own vehicle information and the past own vehicle information is derived (S150). Specifically, in S150, the absolute value of the difference between the current position p0 estimated in S120 and the predicted arrival position p1, which is included in the past own vehicle information obtained in S140, at the specific time t1 corresponding to the current time t0 is derived as one information coincidence degree. Note that, in step S150, the absolute value of the difference between the predicted arrival positions p1 to p4 at the specific times t1 to t4 estimated in S120 and the predicted arrival positions p at the specific times t2 to t5, which corresponds to the specific times t1 to t4 and is included in the past own vehicle information obtained in S140, is also derived as the information coincidence degree.

In addition, it is determined whether or not the information coincidence degree derived in S150 is less than a predetermined specified threshold Th (S160). Specifically, in the determination in S160, it may be determined whether or not each of the absolute values of the difference at each time is equal to or more than a predetermined set threshold Thα or not. If the number of the absolute values of the difference equal to or more than the set threshold Thα is equal to or more than the predetermined number, the information coincidence degree may be determined to be less than the specified threshold Th. In addition, in the determination in S160, if the average value of the absolute values of the difference at each time is equal to or more than the set threshold Tha, the information coincidence degree may be determined to be less than the specified threshold Th.

In addition, the determination in S160 corresponds to each of the current position p0 estimated in S120 and the predicted arrival positions p1 to p4. If the number of the predicted arrival positions p, which are included in the past own vehicle information obtained in S140, at the specific times t1 to t4 is equal to or less than a previously specified value, it may be determined that the absolute value of the difference is equal to or more than the set threshold Thα. In this case, if the specified value is 0, that is, if the predicted arrival position p at the specific time t corresponding to the current position p0 estimated in S120 is not present in the past own vehicle information, the absolute value of the difference may be determined to be equal to or more than the set threshold Tha. If the specified value is 1 or more, that is, if the predicted arrival position p at the specific time t corresponding to the predicted arrival position p1 estimated in S120 is not present in the past own vehicle information, the absolute value of the difference may be determined to be equal to or more than the set threshold Thα.

Note that the specified threshold Th in the present embodiment expresses an acceptable range of the difference between the behavior of the own vehicle estimated in past time (previously) and the current behavior of the own vehicle. The specified threshold Th is specified as a larger value on the basis of the detection accuracy of the sensor group 10, as the accuracy of the state information obtained by the sensor group 10 is lower.

As a result of the determination in S160, if the information coincidence degree is less than the specified threshold Th (S160: YES), the difference between the predicted arrival position p estimated in past time (previously) and the current position p0 exceeds the acceptable range. Hence, it is determined that the own vehicle has not moved just like the behavior estimated by the own vehicle in past time (previously), or the predicted arrival position p in the past own vehicle information does not correspond to the situation of the own vehicle at the current time t0 due to the movement of the own vehicle. Then, the process proceeds to S170.

In step S170, own vehicle information (i.e. current own vehicle information) is transmitted which includes the current position p0, the vehicle speed v0, and the traveling direction d0 estimated in S120, and the predicted arrival positions p1 to p5, the predicted vehicle speeds v1 to v5, and the predicted traveling azimuths d1 to d5 estimated in S130.

Next, the current own vehicle information transmitted in S170 is stored in the own vehicle information storage section 38 (S180). In S180, the past own vehicle information stored in the own vehicle information storage section 38 is rewritten into the current own vehicle information.

Then, the process returns to S110. After returning to S110, in S140, the current own vehicle information rewritten in S180 is obtained as the past own vehicle information.

Meanwhile, as a result of the determination in S160, if the information coincidence degree is equal to or more than the specified threshold Th (S160: NO), the difference between the predicted arrival positions p estimated in past time (previously) and the current position p0 is within the acceptable range. Hence, it is determined that the own vehicle has moved just like the behavior estimated by the own vehicle in past time (previously). Then, the process returns to S110 without transmitting the own vehicle information.

As described above, S110 to S130 of the transmission process function as the own vehicle information estimation section 37. S140 to S160 and S180 function as the own vehicle information transmission determination section 39. S170 functions as the transmission section 40.

<Regarding the Other Vehicle Information Reception Unit>

Next, the other vehicle information reception unit 45 is described with reference to FIG. 3.

The other vehicle information reception unit 45 includes a reception section 46, an other vehicle information storage section 47, and an other vehicle information update section 48. The reception section 46 receives other vehicle information via the antenna 50. The other vehicle information storage section 47 stores other vehicle information received by the reception section 46 in past time (previously) (hereinafter, referred to as "past other vehicle information"). The other vehicle information update section 48 controls storing other vehicle information to the other vehicle information storage section 47, and outputs the other vehicle information to the information indication ECU 70, the seat belt ECU 80, the running safety ECU 90 or the like.

As shown in FIG. 8, the other vehicle information storage section 47 stores the other vehicle information received by the reception section 46. The other vehicle information of each vehicle corresponds to vehicle identification data V1 to Vn (n is a natural number, which is one or more), current position Vn_p0, vehicle speed Vn_v0, traveling direction Vn_d0, predicted arrival position Vn_p1 to Vn_p5, predicted vehicle speed Vn_v1 to Vn_v5, predicted traveling azimuth Vn_d1 to Vn_d5, and final time tf at which the other vehicle information is updated.

<Regarding Reception Process>

Next, an operation of the other vehicle information reception unit 45 (i.e. reception process) is described.

Figure 9:
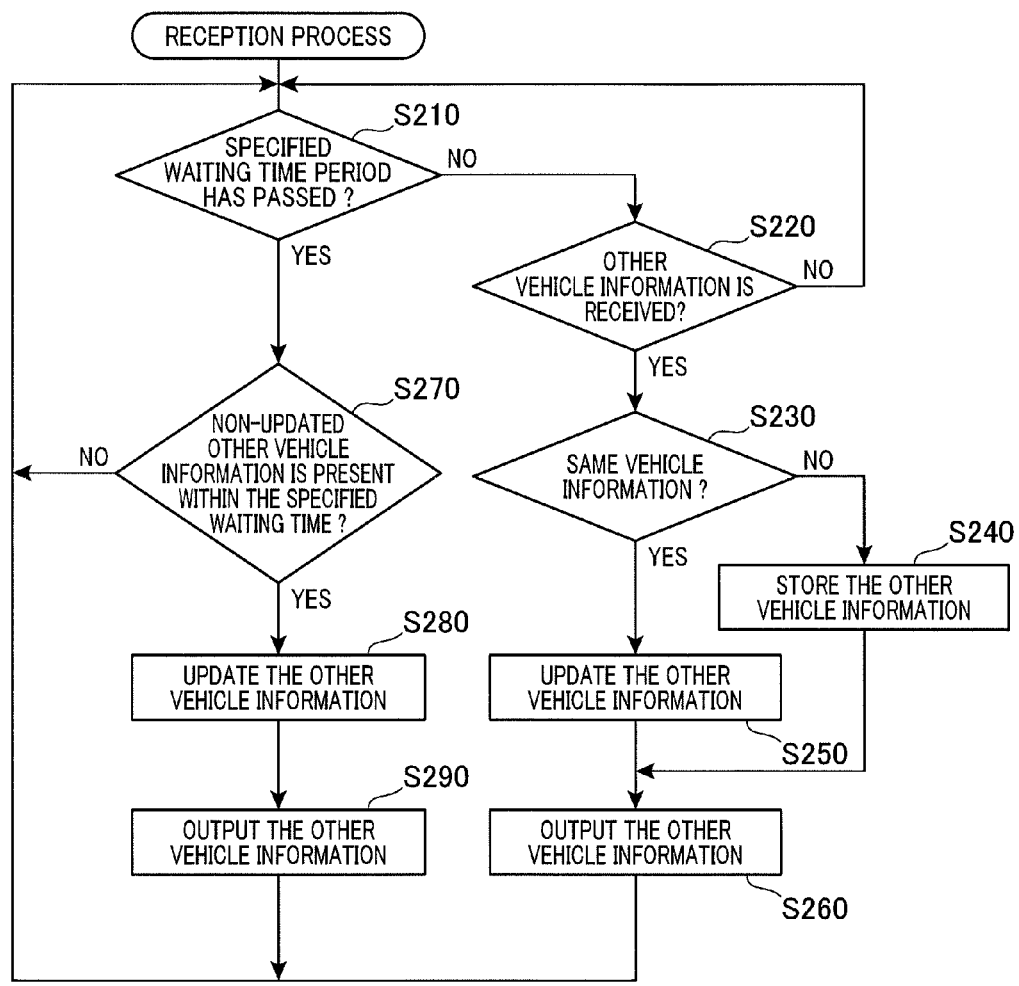
FIG. 9 is a flowchart showing a procedure of a reception process.

FIG. 9 is a flowchart showing a procedure of the reception process. The reception process is performed by the control of the CPU 55 of the communication apparatus 30.

The reception process starts when the communication apparatus 30 is activated (in the present embodiment, when the ignition switch is turned on).

When the reception process starts, it is determined whether or not a specified waiting time period tw, which is a previously specified time length, has passed from the reference time (S210). Note that the reference time is the time sequentially updated every time the specified waiting time period tw has passed. The specified waiting time period tw may be the time length equal to the specific time interval.

As a result of the determination in S210, if the specified waiting time period tw has not passed (S210: NO), it is determined whether or not other vehicle information is received (S220). As a result of the determination in S220, if other vehicle information is not received (S220: NO), the process returns to S210. Meanwhile, as a result of the determination in S220, if the other vehicle information is received (S220: YES), it is determined whether or not the other vehicle information having vehicle identification data V, which is equal to the vehicle identification data V included in the received other vehicle information, is stored in the other vehicle information storage section 47 (S230).

As a result of the determination in S230, if other vehicle information having the same vehicle identification data V is not stored (S230: NO), that is, if other vehicle information concerning an additional another vehicle is received, the other vehicle information is stored in the other vehicle information storage section 47 (S240). Thereafter, the process proceeds to S260.

Meanwhile, as a result of the determination in S230, if other vehicle information having the same vehicle identification data V is stored (S230: YES), the other vehicle information having the same vehicle identification data V is updated to the additionally received other vehicle information (S250). Thereafter, the process proceeds to S260.

In S260, at least the current position p0, the vehicle speed v0, and the traveling direction d0 included in the additionally received other vehicle information are outputted to the information indication ECU 70, the seat belt ECU 80, the running safety ECU 90 and the like (S260). In the information indication ECU 70, the seat belt ECU 80, and the running safety ECU 90, the running safety control is performed on the basis of the current position p0, the vehicle speed v0, and the traveling direction d0. Thereafter, the process proceeds to S210.

Meanwhile, as a result of the determination in S210, if the specified waiting time period tw has passed (S210: YES), it is determined whether or not other vehicle information is present, which has not been updated until the specified waiting time period tw has passed, in the other vehicle information stored in the other vehicle information storage section 47 (S270). As a result of the determination in S270, if other vehicle information is not present which has not been updated until the specified waiting time period tw has passed (S270: NO), the other vehicle information at the current time t0 (i.e. the current position p0, the vehicle speed v0, and the traveling direction d0) has outputted to the information indication ECU 70, the seat belt ECU 80, the running safety ECU 90 and the like. Thereafter, the process returns to S210.

Meanwhile, if other vehicle information is present which has not been updated until the specified waiting time period tw has passed (S270: YES), it is determined that the other vehicle corresponding to the other vehicle information, which has not been updated, has moved just like the other vehicle information received in past time (previously). Then, the other vehicle information is updated (S280). That is, in S280, the content of the other vehicle information stored in the other vehicle information storage section 47 is changed so that the predicted arrival position p, the predicted vehicle speed v, and the predicted traveling azimuth d at the specific time t corresponding to the current time t0 change to the current position p0, the vehicle speed v0, and the traveling direction d0.

Next, the current position p0, the vehicle speed v0, and the traveling direction d0 of the other vehicle information updated as described above are outputted to the information indication ECU 70, the seat belt ECU 80, the running safety ECU 90 and the like (S290). In the information indication ECU 70, the seat belt ECU 80, and the running safety ECU 90, the running safety control is performed on the basis of the current position p0, the vehicle speed v0, and the traveling direction d0. Thereafter, the process returns to S210.

That is, the function obtained by performing the reception process is included in the other vehicle information update section 48.

(Advantages of the First Embodiment)

As described above, in the communication apparatus 30 of the present embodiment, if the own vehicle has not traveled just like the behavior estimated in past time (previously), current own vehicle information is transmitted. If the own vehicle has traveled just like the behavior estimated in past time (previously), current own vehicle information is not transmitted.

At this time, the communication apparatus 30 installed in the other vehicle can recognize the predicted arrival position corresponding to the actual behavior of the vehicle, according to the own vehicle information received in past time (previously) if the current own vehicle information has not received, and according to the current own vehicle information if the current own vehicle information has been received.

Hence, according to the communication apparatus 30 of the present embodiment, the own vehicle information can be transmitted which is required for recognizing the actual behavior of the own vehicle by the communication apparatus 30 installed in the other vehicle, without increasing the frequency of transmitting the own vehicle information.

In other words, according to the communication apparatus 30 of the present embodiment, information corresponding to the behavior of the actual vehicle can be recognized by the communication apparatus 30 installed in the other vehicle, while suppressing the increase of communications traffic.

Meanwhile, when the communication apparatus 30 of the present embodiment is configured so as to transmit the current own vehicle information if the number of the predicted arrival positions p at the specific time t is equal to or less than a specified value, the current own vehicle information is transmitted after the specified time Tp along the time axis in the course of the movement of the own vehicle just like the behavior estimated in past time (previously).

That is, according to the communication apparatus 30 described above, the own vehicle information can be transmitted as needed in the course of the movement of the own vehicle. As a result, the communication apparatus 30 installed in the other vehicle can be prevented from being a state where the communication apparatus 30 cannot recognize the actual behavior of the own vehicle.

Note that when the communication apparatus 30 receives the updated other vehicle information from the communication apparatus 30 installed in the other vehicle, the communication apparatus 30 outputs the current position Vn_p0 of the other vehicle included in the updated other vehicle information to the information indication ECU 70, the seat belt ECU 80, the running safety ECU 90 and the like.

As a result, when the ECUs 70, 80, 90 perform running safety control, the safety can be improved on the basis of the current position Vn_p0 of the other vehicle having high accuracy.

In addition, in the communication apparatus 30 of the present embodiment, even when the updated other vehicle information is not received from the communication apparatus 30 installed in the other vehicle, the predicted arrival position Vn_p of the other vehicle corresponding to the current time t0 included in the other vehicle information received in past time (previously) is set to the current position Vn_p0 of the other vehicle, and thereafter the current position Vn_p0 is outputted to the information indication ECU 70, the seat belt ECU 80, the running safety ECU 90 and the like.

Hence, according to the communication apparatus 30 of the present embodiment, even when the other vehicle information is not received, outputting the other vehicle information to the ECUs 70, 80, 90 can be prevented from being discontinued so as to perform the running safety control without any trouble.

Second Embodiment

Next, the second embodiment is described.

The information system 1 of the second embodiment differs from the information system 1 of the first embodiment in the contents of the transmission process performed by the communication apparatus 30. Hence, the same reference numerals as in the communication apparatus 30 of the first embodiment denote the same parts in the communication apparatus 30 of the second embodiment. A transmission process different from that of the communication apparatus 30 of the first embodiment is mainly explained.

<Regarding the Transmission Process>

Figure 10:
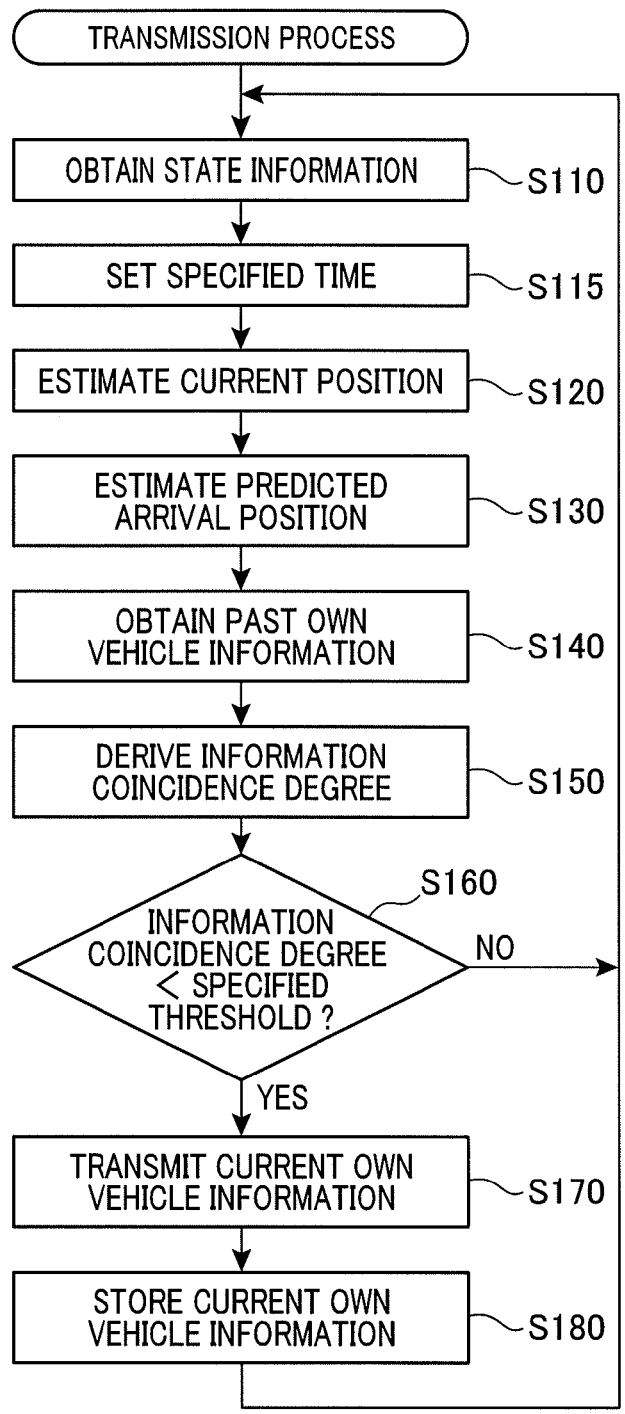
FIG. 10 is a flowchart showing a procedure of a transmission process according to a second embodiment.

FIG. 10 is a flowchart showing a procedure of a transmission process according to the second embodiment.

The transmission process of the present embodiment starts when the communication apparatus 30 is activated (in the present embodiment, when the ignition switch is turned on).

As shown in FIG. 10, when the transmission process starts, state information is obtained from the sensor group 10 (S110). Next, specified time Tp is set on the basis of the state information obtained in S110 (S115).

In S115 of the present embodiment, as shown in the following expression (1), the time length obtained by subtracting correction time Tsensor based on the state information (hereinafter, referred to as "state correction time") and correction time Tmap based on the map data (hereinafter, referred to as "map correction time") from specified time Tp_fix, which is a previously specified characteristic value (e.g. 1000 ms), (hereinafter, referred to as "reference specified time") is set as the specified time Tp.

$$Tp = Tp\_\text{fix} - T\text{sensor} - T\text{map} \tag{1}$$

Note that, as shown in FIG. 11, the state correction time Tsensor is specified so as to be, for example, a larger value as the acceleration applied to the own vehicle becomes larger, or a larger value as the steering angle of the own vehicle is larger, that is, so that the value subtracted from the reference specified time Tp_fix becomes larger.

In addition, the map correction time Tmap is specified so as to be, for example, a larger value as the inclination at the current position p0 becomes larger, or a larger value as the curvature R of a curve at the current position p0 becomes smaller, that is, so that the value subtracted from the reference specified time Tp_fix becomes larger.

That is, the state correction time Tsensor and the map correction time Tmap are defined so as to be a larger value as the possibility is higher that the behavior of the own vehicle is not just like the behavior estimated in past time (previously).

Note that since the transmission process of the present embodiment is similar to that of the first embodiment except for including S115, the explanation of steps S120 and later is omitted.

(Advantages of the Second Embodiment)

As described above, according to the communication apparatus 30 of the present embodiment, the specified time Tp having shorter time length is set as the behavior of the own vehicle represented by the state information is changed more easily. As a result, according to the communication apparatus 30 of the present embodiment, the number of times of transmission of the own vehicle information and the number of times of update of the own vehicle information stored in the own vehicle information storage section 38 can be larger, as the behavior of the own vehicle is changed more easily.

In this case, the reception side, which receives the own vehicle information, recognizes that, when the own vehicle information cannot be received after the specified time Tp has passed, the own vehicle information could not be received not because the actual behavior of the own vehicle is just like the behavior predicted in past time (previously) but because abnormality is caused in the own vehicle information received from the communication apparatus 30.

(Other Embodiments)

It will be appreciated that the present invention is not limited to the configurations described above, but any and all modifications, variations or equivalents, which may occur to those who are skilled in the art, should be considered to fall within the scope of the present invention.

For example, in the above embodiment, the information coincidence degree is exemplified such as the absolute value of the difference between the current position p0 and the predicted arrival position p1 at the specific time t1 included in the past own vehicle information corresponding to the current time t0, and the absolute value of the difference between the predicted arrival position p and the predicted arrival position p1 at the specific time t1 included in the past own vehicle information corresponding to the predicted arrival position p. However, the information coincidence degree is not limited to the above. The information coincidence degree may be a value representing the coincidence degree between the current own vehicle information and the past own vehicle information.

Note that, in the above embodiment, the specified threshold Th is a fixed value. However, the specified threshold Th is not limited to this, but may be changed as needed in the course of the transmission process.

Furthermore, in the above embodiment, the antenna 50 is shared between the own vehicle information transmission unit 35 and the other vehicle information reception unit 45. However, the own vehicle information transmission unit 35 and the other vehicle information reception unit 45 may individually have the antenna 50.

Figure 12:
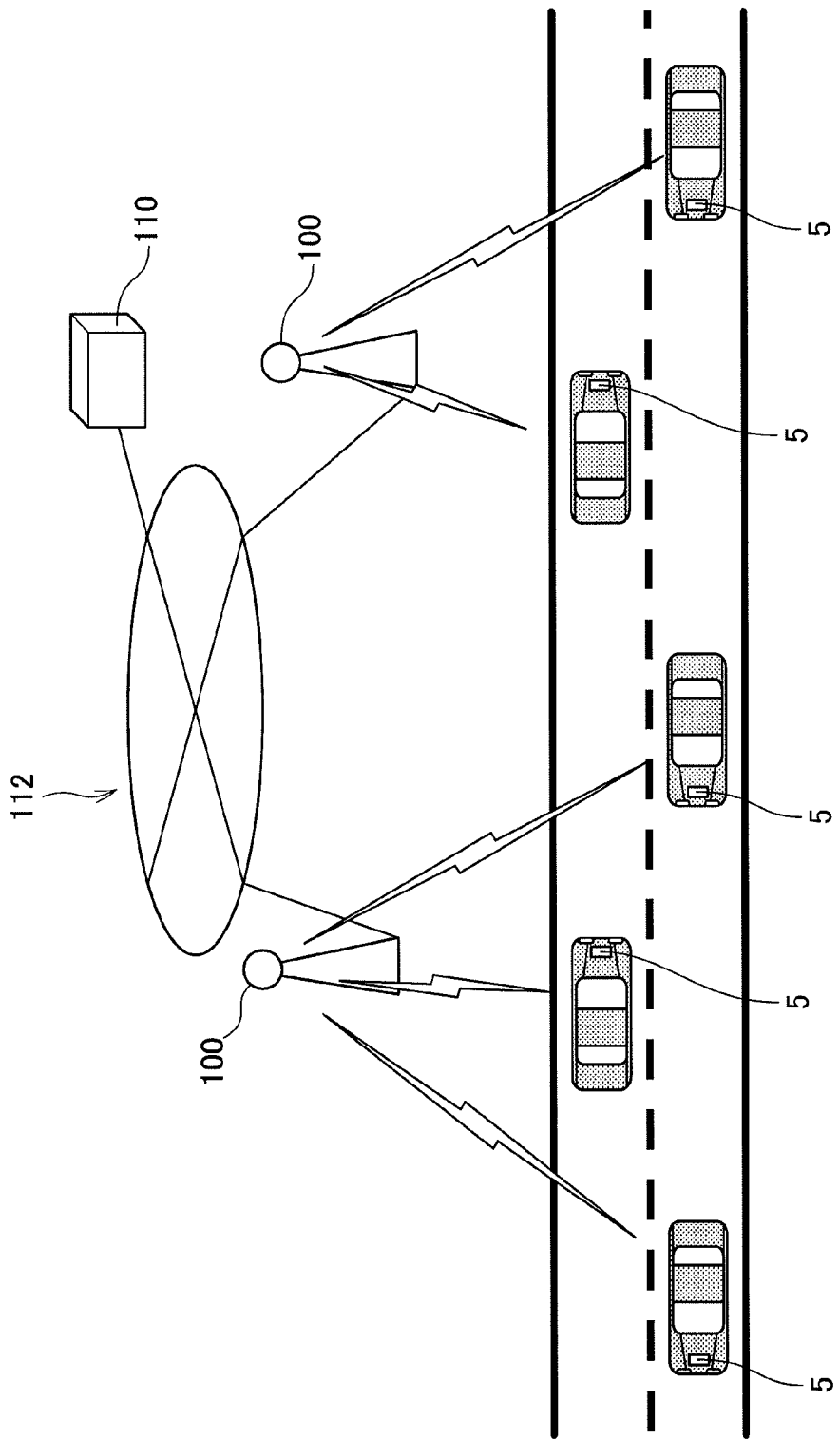
FIG. 12 is a diagram showing a modification example of a communication method of the communication apparatus.

Note that, in the communication apparatus 30 of the above embodiment, information is communicated by inter-vehicle communication. However, the communication method for communicating information is not limited to the above. For example, the communication method of the communication apparatus 30 may be wide area wireless communication. In this case, as shown in FIG. 12, the information system 1 is preferably configured so that the communication apparatus 30 included in each of the in-vehicle apparatuses 5 performs communication with a base station 100, and information collected by the communication (i.e. own vehicle information) is stored in an information collecting server 110 via a network 112.

In the communication apparatus 30 of the above embodiment, the function for obtaining the current time t0 from the timer 25 corresponds to a time information obtaining means (unit). The function for obtaining a detection result from the sensor group 10 (e.g. S110 in the transmission process) corresponds to a state information obtaining means (unit). The own vehicle information estimation section 37 corresponds to an own vehicle information generating means (unit). The own vehicle information transmission determination section 39 and the transmission section 40 correspond to an information transmitting means (unit) and an information storage means (unit). In addition, S115 of the transmission process in the second embodiment corresponds to a time changing means (unit).

In addition, in the communication apparatus 30 of the above embodiment, the reception section 46 corresponds to an other vehicle information reception means (unit). The other vehicle information update section 48 corresponds to a first information outputting means (unit), a first storage control means (unit), a second information outputting means (unit), and a second storage control means (unit).

Note that the own vehicle information storage section 38 corresponds to a first storage means (unit). The other vehicle information storage section 47 corresponds to a second storage means (unit) and a third storage means (unit).

Hereinafter, aspects of the above-described embodiments will be summarized.

(1) As an aspect of the embodiment, a communication apparatus installed in a vehicle is provide.

In the present communication apparatus, a time information obtaining unit obtains a current time. A state information obtaining unit repeatedly obtains, along a time axis, state information which represents a state of an own vehicle at the current time and includes a current position of the own vehicle, a traveling speed of the own vehicle, and a traveling direction of the own vehicle.

An own vehicle information generating unit estimates predicted arrival positions representing positions of the own vehicle at specified times, which are specified by specific time intervals between the current time obtained by the time information obtaining unit and a specified time, which is a specified time length, on the basis of the state information obtained by the state information obtaining unit. The own vehicle information generating unit repeatedly generates, along the time axis, own vehicle information including the current position of the own vehicle included in the state information and the predicted arrival positions. In addition, an information transmitting unit transmits the own vehicle information generated by the own vehicle information generating unit. An information storage unit stores the own vehicle information transmitted by the information transmitting unit into a first storage section as past own vehicle information.

Note that, in the communication apparatus, the information transmitting unit obtains, every time the own vehicle information is generated by the own vehicle information generating unit, an information coincidence degree representing the degree of the coincidence between current own vehicle information which is the own vehicle information generated by the own vehicle information generating unit and the past own vehicle information stored in the first storage section. The information transmitting unit transmits the current own vehicle information if the information coincidence degree is less than a specified threshold.

That is, in the present communication apparatus, if the information coincidence degree is less than the specified threshold, that is, if the own vehicle has not traveled just like the behavior estimated in past time (previously), current own vehicle information is transmitted. If the information coincidence degree is equal to or more than the specified threshold, that is, if the own vehicle has traveled just like the behavior estimated in past time (previously), current own vehicle information is not transmitted.

At this time, another communication apparatus, which is installed in another vehicle and has received own vehicle information from the present communication apparatus, recognizes the predicted arrival position corresponding to the actual behavior of the vehicle. Hence, according to the present communication apparatus, the own vehicle information can be transmitted which the other communication apparatus requires for recognizing the actual behavior of the own vehicle, without increasing the frequency of transmitting the own vehicle information.

In other words, according to the present communication apparatus, information corresponding to the behavior of the actual vehicle can be recognized by another apparatus, while suppressing the increase of communications traffic.

In general, as the accuracy of the state information is higher, the accuracy of estimating the predicted arrival position becomes higher. As the accuracy of the state information is lower, the accuracy of estimating the predicted arrival position becomes lower.

If the accuracy of estimating the predicted arrival position is lower, an error is generated between the position where the own vehicle actually arrives at and the predicted arrival position. Hence, even when the information coincidence degree is obtained which represents high degree of the coincidence between the current own vehicle information and the past own vehicle information, the reliability thereof is low. Even in this case, it is preferable that the own vehicle information is appropriately transmitted.

(2) Hence, in the present apparatus, the specified threshold may be specified so as to be a larger value as accuracy of the state information is lower, on the basis of the accuracy of the state information obtained by the state information obtaining unit.

(3) The information transmitting unit may use the current position of the own vehicle included in the current own vehicle information as a current own vehicle position, and may use each of the predicted arrival positions included in the current own vehicle information as a current estimated position. The information transmitting unit may use the predicted arrival positions, which are included in the past own vehicle information, at specific times which respectively correspond to the current own vehicle position and the current estimated position, as past estimated positions.

In this case, the information coincidence degree may be the degree of the coincidence between the predicted arrival position, which is included in the past own vehicle information, at the specific time corresponding to the current own vehicle position and the current own vehicle position, and may be the degree of the coincidence between the predicted arrival position, which is included in the past own vehicle information, at the specific time corresponding to the current estimated position and the current estimated position. In addition, the information coincidence degree may be the sum or the product of the degrees of the coincidence.

That is, at least one degree of coincidence between each of the current own vehicle position and the current estimated position and each of the past estimated positions may be obtained as the information coincidence degree.

According to the communication apparatus, the current own vehicle information can be limited so as to be transmitted when the own vehicle has not arrived at the current estimated position or when it is predicted that the own vehicle cannot arrive at the current estimated position.

Meanwhile, even when the own vehicle has traveled just like the behavior estimated in past time (previously), a communication apparatus, which receives the own vehicle information from the present communication apparatus, cannot recognize the behavior of the actual vehicle, if additional own vehicle information is not transmitted in the course of the movement of the own vehicle.

(4) Hence, the information transmitting unit may transmit the current own vehicle information if the number of the past estimated positions at the specific times each of which corresponds to the current own vehicle position and the current estimated position is equal to or less than a previously specified value.

According to the present communication apparatus, the own vehicle information can be transmitted as needed in the course of the movement of the own vehicle, and the past own vehicle information stored in the first storage section can be updated.

Note that the above specified value may be 0, that is, the specified value may mean that the past estimated position at the specific time corresponding to the current own vehicle position is not present in the past own vehicle information. The above specified value may be 1, that is, the specified value may mean that the number of past estimated positions at the specific time corresponding to the current estimated position is not more than one.

Meanwhile, even under a condition where the behavior of the own vehicle easily changes, the present communication apparatus is required to increase the number of times of transmission of the own vehicle information so that a communication apparatus, which receives the own vehicle information from the present communication apparatus, continues to recognize the actual behavior of the own vehicle.

(5) Hence, in the present communication apparatus, a time changing unit may change the specified time on the basis of the state information obtained by the state information obtaining unit.

(6) The time changing unit may shorten the specified time as the behavior of the own vehicle represented by the state information is changed more easily.

According to the communication apparatus, the number of times of transmission of the own vehicle information and the number of times of update of the own vehicle information stored in the first storage section can be larger, as the behavior of the own vehicle is changed more easily.

In this case, the reception side, which receives the own vehicle information, recognizes that, when the own vehicle information cannot be received after the specified time has passed, the own vehicle information could not be received not because the actual behavior of the own vehicle is just like the behavior predicted in past time (previously) but because abnormality has occurred in the own vehicle information received from the present communication apparatus.

(7) In the present communication apparatus, an other vehicle information reception unit may receive other vehicle information, which is transmitted from a communication apparatus installed in another vehicle and includes a current position of the other vehicle at the current time. A first information outputting unit may output the current position of the other vehicle included in the other vehicle information received by the other vehicle information reception unit to a control unit which controls units installed in the own vehicle apparatus.

According to the present communication apparatus, the current position of the other vehicle received from a communication apparatus installed in another vehicle can be transmitted to the control unit.

In addition, when the control unit performs running safety control for improving running safety of the own vehicle, the safety can be improved on the basis of the current position of the other vehicle having high accuracy.

Meanwhile, if the vehicle has not arrived at the past estimated position, the communication apparatus transmits the other vehicle information. If the vehicle has arrived at the past estimated position, the communication apparatus does not transmit the other vehicle information.

(8) Hence, in the present communication apparatus, if the other vehicle information includes other vehicle predicted positions representing positions of the other vehicle at the specific times until the specified time, a first storage control unit may store the other vehicle information received by the other vehicle information reception unit in a second storage section. A second information outputting unit may output the other vehicle predicted position at the specific time corresponding to the current time, which is included in the other vehicle information stored in the second storage section, to a control unit which controls units installed in the own vehicle, if the other vehicle information reception unit has not been received the other vehicle information for more than a specified waiting time period, which is a previously specified time length.

Hence, if the other vehicle information is not received, the other vehicle is assumed to exhibit the behavior predicted in past time (previously). Then, an other vehicle predicted position of the other vehicle information, which is stored in the second storage section, at the specific time corresponding to the current time is outputted to the control unit. Thereby, outputting the other vehicle information to the control unit can be prevented from being discontinued.

(9) In addition, in the present communication apparatus, if the other vehicle information includes vehicle identification data identifying the vehicle having the communication apparatus which has transmitted the other vehicle information, a second storage control unit stores the other vehicle information received by the other vehicle information reception unit in a third storage section. The second storage control unit stores the current other vehicle information in the third storage section, if the vehicle identification data included in the current other vehicle information does not coincide with vehicle identification data included in the past other vehicle information. The second storage control unit updates the past other vehicle information corresponding to the vehicle identification data to the current other vehicle information, if the vehicle identification data included in the current other vehicle information coincides with one vehicle identification data included in the past other vehicle information. The first information outputting unit outputs the current other vehicle information stored in the third storage section by the second storage control unit to the control unit as the other vehicle information.

Note that the current other vehicle information is other vehicle information received by the other vehicle information reception unit. The past other vehicle information is other vehicle information stored in the third storage section.

According to the present communication apparatus, regarding the other vehicle information from the same vehicle, the other vehicle information stored in the third storage section is updated (rewritten). Hence, the storage capacity of the third storage section is not required to be unnecessarily larger.

(10) In the present communication apparatus, the information transmitting unit may transmit the own vehicle information by inter-vehicle communication. In this case, the information receiving unit receives the own vehicle (other vehicle) information by inter-vehicle communication.

(11) In addition, the information transmitting unit may transmit the own vehicle information by a wide area communication network. In this case, the information receiving unit receives the own vehicle (other vehicle) information by a wide area communication network.

(12) A communication method is performed by a communication apparatus installed in a vehicle.

In the present communication method, a time information obtaining step obtains a current time. A state information obtaining step repeatedly obtains, along a time axis, state information which represents a state of an own vehicle at the current time and includes a current position of the own vehicle, a traveling speed of the own vehicle, and a traveling direction of the own vehicle. An own vehicle information generating step estimates predicted arrival positions representing positions of the own vehicle at specific times, which are specified by specific time intervals, between the current time obtained by the time information obtaining step and a specified time, which is a specified time length, on the basis of the state information obtained by the state information obtaining step, and which repeatedly generates, along the time axis, own vehicle information including the current position of the own vehicle included in the state information and the predicted arrival positions.

In addition, an information transmitting step transmits the own vehicle information generated by the own vehicle information generating step. An information storage step stores the own vehicle information transmitted by the information transmitting step into a first storage section as past own vehicle information.

Note that the information transmitting step obtains, every time the own vehicle information is generated by the own vehicle information generating step, an information coincidence degree representing the degree of the coincidence between current own vehicle information which is the own vehicle information generated by the own vehicle information generating step and the past own vehicle information stored in the first storage section. The information transmitting step then transmits the current own vehicle information if the information coincidence degree is less than a specified threshold.

According to the present communication method, the same advantage as those of the above (1) can be obtained.

(13) Note that, in the information transmitting step, at least one degree of coincidence between each of the current own vehicle position and the current estimated position and each of the past estimated positions may be obtained as the information coincidence degree.

The current own vehicle position is the current position of the own vehicle included in the current own vehicle information. The current estimated position is each of the predicted arrival positions included in the current own vehicle information. The past estimated positions are the predicted arrival positions, which are included in the past own vehicle information, at specific times which respectively correspond to the current own vehicle position and the current estimated position.

According to the present communication method, the same advantage as those of the above (3) can be obtained.

(14) In the present communication method, an other vehicle information reception step receives other vehicle information, which is transmitted from a communication apparatus installed in another vehicle and includes a current position of the other vehicle at the current time. A first information outputting step outputs the current position of the other vehicle included in the other vehicle information received by the other vehicle information reception step to a control unit which controls units installed in the own vehicle apparatus.

According to the present communication method, the same advantages as those of the above (7) can be obtained.

(15) In the present communication method, a first storage control step may store the other vehicle information received by the other vehicle information reception step in a second storage section. A second information outputting step may output the other vehicle predicted position at the specific time corresponding to the current time, which is included in the other vehicle information stored in the second storage section, to a control unit which controls units installed in the own vehicle, if the other vehicle information reception step has not received the other vehicle information for more than a specified waiting time period, which is a previously specified time length.

According to the present communication method, the same advantage as those of the above (8) can be obtained.

(16) In the present communication method, a second storage control step may store the other vehicle information received by the other vehicle information reception step in a third storage section. In this case, the second storage control step may store the current other vehicle information in the third storage section, if the vehicle identification data included in the current other vehicle information does not coincide with vehicle identification data included in the past other vehicle information. The second storage control step may update the past other vehicle information corresponding to the vehicle identification data to the current other vehicle information, if the vehicle identification data included in the current other vehicle information coincides with one vehicle identification data included in the past other vehicle information. In addition, the first information outputting step may output the current other vehicle information stored in the third storage section by the second storage control step to the control unit as the other vehicle information.

According to the present communication method, the same advantage as those of the above (9) can be obtained.

What is claimed is:

1. A communication apparatus, which is used in a system in which vehicle information is periodically transmitted and received between vehicles, and is installed in the vehicles, comprising:
    a time information obtaining unit which obtains a current time;
    a state information obtaining unit which repeatedly obtains state information which represents a state of an own vehicle at the current time and includes a current position of the own vehicle, a traveling speed of the own vehicle, and a traveling direction of the own vehicle;
    an own vehicle information generating unit which estimates predicted arrival positions representing positions of the own vehicle at specific times, which are specified by specific time intervals between the current time obtained by the time information obtaining unit and a specified time, which is a specified time length, on the basis of the state information obtained by the state information obtaining unit, and which repeatedly generates own vehicle information including the current position of the own vehicle included in the state information and the predicted arrival positions;
    an information transmitting unit which transmits the own vehicle information generated by the own vehicle information generating unit; and
    an information storage unit which stores the own vehicle information transmitted by the information transmitting unit into a first storage section as past own vehicle information, wherein
    the information transmitting unit obtains, every time the own vehicle information is generated by the own vehicle information generating unit, an information coincidence degree representing the degree of the coincidence between current own vehicle information which is the own vehicle information generated by the own vehicle information generating unit and the past own vehicle information stored in the first storage section, and stops transmitting the current own vehicle information if the information coincidence degree is not less than a specified threshold.

2. The communication apparatus according to claim 1, wherein
    the specified threshold is specified so as to be a larger value as accuracy of the state information is lower, on the basis of the accuracy of the state information obtained by the state information obtaining unit.

3. The communication apparatus according to claim 1, wherein
    the information transmitting unit uses the current position of the own vehicle included in the current own vehicle information as a current own vehicle position, and uses each of the predicted arrival positions included in the current own vehicle information as a current estimated position,
    the information transmitting unit uses the predicted arrival positions, which are included in the past own vehicle information, at specific times which respectively correspond to the current own vehicle position and the current estimated position, as past estimated positions, and
    at least one degree of coincidence between each of the current own vehicle position and the current estimated position and each of the past estimated positions is obtained as the information coincidence degree.

4. The communication apparatus according to claim 1, wherein
    the information transmitting unit transmits the current own vehicle information if the number of the past estimated positions at the specific times each of which corresponds to the current own vehicle position and the current estimated position is equal to or less than a previously specified value.

5. The communication apparatus according to claim 1, further comprising a time changing unit which changes the specified time on the basis of the state information obtained by the state information obtaining unit.

6. The communication apparatus according to claim 5, wherein
    the time changing unit shortens the specified time as the behavior of the own vehicle represented by the state information is changed more easily.

7. The communication apparatus according to claim 1, further comprising:
an other vehicle information reception unit which receives other vehicle information, which is transmitted from a communication apparatus installed in another vehicle and includes a current position of the other vehicle at the current time; and
a first information outputting unit which outputs the current position of the other vehicle included in the other vehicle information received by the other vehicle information reception unit to a control unit which controls units installed in the own vehicle apparatus.

8. The communication apparatus according to claim 7, wherein
the other vehicle information includes other vehicle predicted positions representing positions of the other vehicle at the specific times until the specified time, the apparatus further comprising:
a first storage control unit which stores the other vehicle information received by the other vehicle information reception unit in a second storage section; and
a second information outputting unit which outputs the other vehicle predicted position at the specific time corresponding to the current time, which is included in the other vehicle information stored in the second storage section, to a control unit which controls units installed in the own vehicle, if the other vehicle information reception unit has not been received the other vehicle information for more than a specified waiting time period, which is a previously specified time length.

9. The communication apparatus according to claim 7, further comprising a second storage control unit which stores the other vehicle information received by the other vehicle information reception unit in a third storage section, wherein
the other vehicle information includes vehicle identification data identifying the vehicle having the communication apparatus which has transmitted the other vehicle information,
the second storage control unit uses the other vehicle information received by the other vehicle information reception unit as current other vehicle information, and uses the other vehicle information stored in the third storage section as past other vehicle information,
the second storage control unit stores the current other vehicle information in the third storage section, if the vehicle identification data included in the current other vehicle information does not coincide with vehicle identification data included in the past other vehicle information,
the second storage control unit updates the past other vehicle information corresponding to the vehicle identification data to the current other vehicle information, if the vehicle identification data included in the current other vehicle information coincides with one vehicle identification data included in the past other vehicle information, and
the first information outputting unit outputs the current other vehicle information stored in the third storage section by the second storage control unit to the control unit as the other vehicle information.

10. The communication apparatus according to claim 1, wherein
the information transmitting unit transmits the own vehicle information by inter-vehicle communication.

11. The communication apparatus according to claim 1, wherein
the information transmitting unit transmits the own vehicle information by a wide area communication network.

12. The communication apparatus according to claim 1, wherein
the information coincidence degree is the absolute value of the difference between a current vehicle position that is included in the own vehicle information and a predicted arrival position that is included in the past own vehicle information.

13. A communication method performed by a communication apparatus, which is used in a system in which vehicle information is periodically transmitted and received between vehicles, and is installed in the vehicles, comprising:
a time information obtaining step of obtaining a current time;
a state information obtaining step of repeatedly obtaining state information which represents a state of an own vehicle at the current time and includes a current position of the own vehicle, a traveling speed of the own vehicle, and a traveling direction of the own vehicle;
an own vehicle information generating step of estimating predicted arrival positions representing positions of the own vehicle at specific times, which are specified by specific time intervals, between the current time obtained by the time information obtaining step and a specified time, which is a specified time length, on the basis of the state information obtained by the state information obtaining step, and which repeatedly generates own vehicle information including the current position of the own vehicle included in the state information and the predicted arrival positions;
an information transmitting step of transmitting the own vehicle information generated in the own vehicle information generating step; and
an information storage step of storing the own vehicle information transmitted by the information transmitting step into a first storage section as past own vehicle information, wherein
the information transmitting step obtains, every time the own vehicle information is generated by the own vehicle information generating step, an information coincidence degree representing the degree of the coincidence between current own vehicle information which is the own vehicle information generated by the own vehicle information generating step and the past own vehicle information stored in the first storage section, and stops transmitting transmits e current own vehicle information if the information coincidence degree is not less than a specified threshold.

14. The communication method according to claim 13, wherein
the information transmitting step uses the current position of the own vehicle included in the current own vehicle information as a current own vehicle position, and uses each of the predicted arrival positions included in the current own vehicle information as a current estimated position,
the information transmitting step uses the predicted arrival positions, which are included in the past own vehicle information, at specific times which respectively correspond to the current own vehicle position and the current estimated position, as past estimated positions, and
at least one degree of coincidence between each of the current own vehicle position and the current estimated position and each of the past estimated positions is obtained as the information coincidence degree.

15. The communication method according to claim 13, further comprising:
- an other vehicle information reception step of receiving other vehicle information, which is transmitted from a communication apparatus installed in another vehicle and includes a current position of the other vehicle at the current time; and
- a first information outputting step of outputting the current position of the other vehicle included in the other vehicle information received by the other vehicle information reception step to a control unit which controls units installed in the own vehicle apparatus.

16. The communication method according to claim 15, wherein
the other vehicle information includes other vehicle predicted positions representing positions of the other vehicle at the specific times until the specified time, the apparatus further comprising:
- a first storage control step of storing the other vehicle information received by the other vehicle information reception step in a second storage section; and
- a second information outputting step of outputting the other vehicle predicted position at the specific time corresponding to the current time, which is included in the other vehicle information stored in the second storage section, to a control unit which controls units installed in the own vehicle, if the other vehicle information reception step has not received the other vehicle information for more than a specified waiting time period, which is a previously specified time length.

17. The communication method according to claim 15, further comprising a second storage control step of storing the other vehicle information received by the other vehicle information reception step in a third storage section, wherein the other vehicle information includes vehicle identification data identifying the vehicle having the communication apparatus which transmitted the other vehicle information, the second storage control step uses the other vehicle information received by the other vehicle information reception step as current other vehicle information, and uses the other vehicle information stored in the third storage section as past other vehicle information, the second storage control step stores the current other vehicle information in the third storage section, if the vehicle identification data included in the current other vehicle information does not coincide with vehicle identification data included in the past other vehicle information, the second storage control step updates the past other vehicle information corresponding to the vehicle identification data to the current other vehicle information, if the vehicle identification data included in the current other vehicle information coincides with one vehicle identification data included in the past other vehicle information, and the first information outputting step outputs the current other vehicle information stored in the third storage section by the second storage control step to the control unit as the other vehicle information.

18. The communication method according to claim 13, wherein
the information coincidence degree is the absolute value of the difference between a current vehicle position that is included in the own vehicle information and a predicted arrival position that is included in the past own vehicle information.

* * * * *